US012100263B2

(12) United States Patent
Huke et al.

(10) Patent No.: US 12,100,263 B2
(45) Date of Patent: *Sep. 24, 2024

(54) METHOD OF NOTIFYING USER OF A KNOWN CONTACT'S WAGER

(71) Applicant: AdrenalineIP, Washington, DC (US)

(72) Inventors: Casey Alexander Huke, Washington, DC (US); John Cronin, Jericho, VT (US); Joseph W. Beyers, Saratoga, CA (US); Michael D'Andrea, Burlington, VT (US)

(73) Assignee: AdrenalineIP, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/163,375

(22) Filed: Feb. 2, 2023

(65) Prior Publication Data

US 2023/0177917 A1 Jun. 8, 2023

Related U.S. Application Data

(63) Continuation of application No. 17/398,342, filed on Aug. 10, 2021, now Pat. No. 11,574,520.

(60) Provisional application No. 63/111,223, filed on Nov. 9, 2020.

(51) Int. Cl.

| | |
|---|---|
| *A63F 9/24* | (2006.01) |
| *A63F 11/00* | (2006.01) |
| *G06F 13/00* | (2006.01) |
| *G06F 17/00* | (2019.01) |
| *G07F 17/32* | (2006.01) |

(52) U.S. Cl.
CPC ........ *G07F 17/323* (2013.01); *G07F 17/3288* (2013.01)

(58) Field of Classification Search
CPC ... G07F 17/32; G07F 17/3201; G07F 17/3214
USPC .............................. 463/1, 20, 22, 25, 30, 39
See application file for complete search history.

(56) References Cited

U.S. PATENT DOCUMENTS

| | | | |
|---|---|---|---|
| 10,356,035 | B1 | 7/2019 | Gravino et al. |
| 2004/0030649 | A1 | 2/2004 | Nelson et al. |
| 2013/0304721 | A1 | 11/2013 | Fakeih |
| 2015/0310703 | A1 | 10/2015 | Katz et al. |
| 2019/0114060 | A1 | 4/2019 | Resudek |

OTHER PUBLICATIONS

Notification of Transmittal of the International Search Report and the Written Opinion of the International Searching Authority issued on Dec. 7, 2021, in connection with corresponding international Application No. PCT/US2021/058028; 6 pages.

*Primary Examiner* — Adetokunbo O Torimiro
(74) *Attorney, Agent, or Firm* — Maier & Maier, PLLC

(57) ABSTRACT

The present disclosure provides a method of notifying a user of a friend's wager allowing the user to place the same wager or the opposite wager to bet with or against their friends. The method includes being able to add friends on a wagering app, determining the current wager market that the user is in, and using the friend data stored to determine if one or more of the user's friends are in the same wager market or participating in wagering on the same live event and then notifying the user if one or more of their friends places a wager through a notification on the wagering app.

11 Claims, 3 Drawing Sheets

Figure 1:
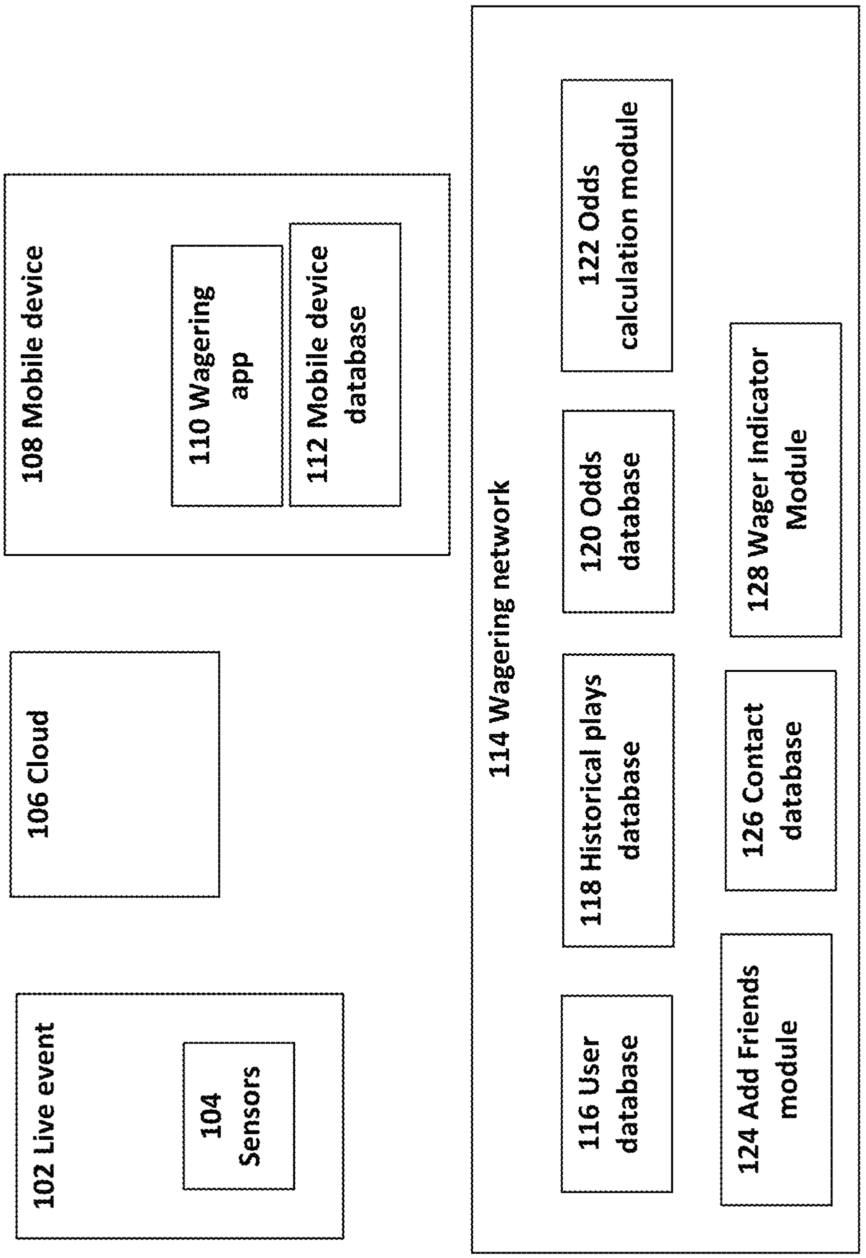

| User ID | E-mail | Mobile Number |
| --- | --- | --- |
| JS123456 | Johnsmith@gmail.com | (123)456-7891 |
| TE987654 | Tomedwards@gmail.com | (987)654-3219 |
| CC078965 | ChuckCobalt@gmail.com | (456)789-1234 |
| - | - | - |
| - | - | - |
| - | - | - |

METHOD OF NOTIFYING USER OF A KNOWN CONTACT'S WAGER

FIELD

The present disclosures are generally related to play-by-play wagering on live sporting events.

BACKGROUND

Currently, an issue with play-by-play wagering networks is that a user is not notified in a timely fashion when and if one of their friends places a wager on the same game or wager market in which they are currently playing.

Also, there is no easy way for a user to determine wagers placed by their friends unless they exit a wagering market to view the friends wagering history, and in doing so, the user does not have enough time to place the same wager or opposite wager.

Lastly, it is difficult for users to play together as friends unless they communicate in some fashion to discuss the wagers they are making. In a play-by-play environment, communicating this can be extremely difficult due to the time constraints on the wagers.

Thus, there is a need in the prior art to notify users of friend wagers quickly and efficiently.

SUMMARY

Methods, systems, and apparatuses for determining when to send notifications and sending notifications in a wagering network. In one embodiment, a method for informing a user of wagers of a known contact on a wagering network may include receiving a first set of known contact data from a user and comparing the data to at least an additional set of contact data stored in a user database for a match; storing the match within a contact database; extracting a set of user wager market data from the contact database and querying the user database for at least an additional set of user wager market data for a match; informing the user of the match or an absence of a match; displaying a match on a device of the user; and determining if the user is still in the same wager market.

In another embodiment, a system for informing a user of wagers of a known contact on a wagering network can include an adds friends module; a wager indicator module; a contact database; a user database, where the adds friend module is configured to receive input data from a user, compare the data with the user database for a match, and store the match in the contact database; the wager indicator module configured to extract user data from the contact database, compare the data with the user database for a match, extract the match, notify the user of the match, and determine if the user is still in the same wager market; and the contact database and the user database are configured to house at least a user ID, an email address, a mobile number, an age of the user, an interest of the user, a wager amount of the user, a favorite event of the user, and current user balance and standings.

BRIEF DESCRIPTIONS OF THE DRAWINGS

The accompanying drawings illustrate various embodiments of systems, methods, and various other aspects of the embodiments. Any person with ordinary art skills will appreciate that the illustrated element boundaries (e.g., boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 1: illustrates a system for notifications for known contact or friend wagers, according to an embodiment.

Figures 2, 3:
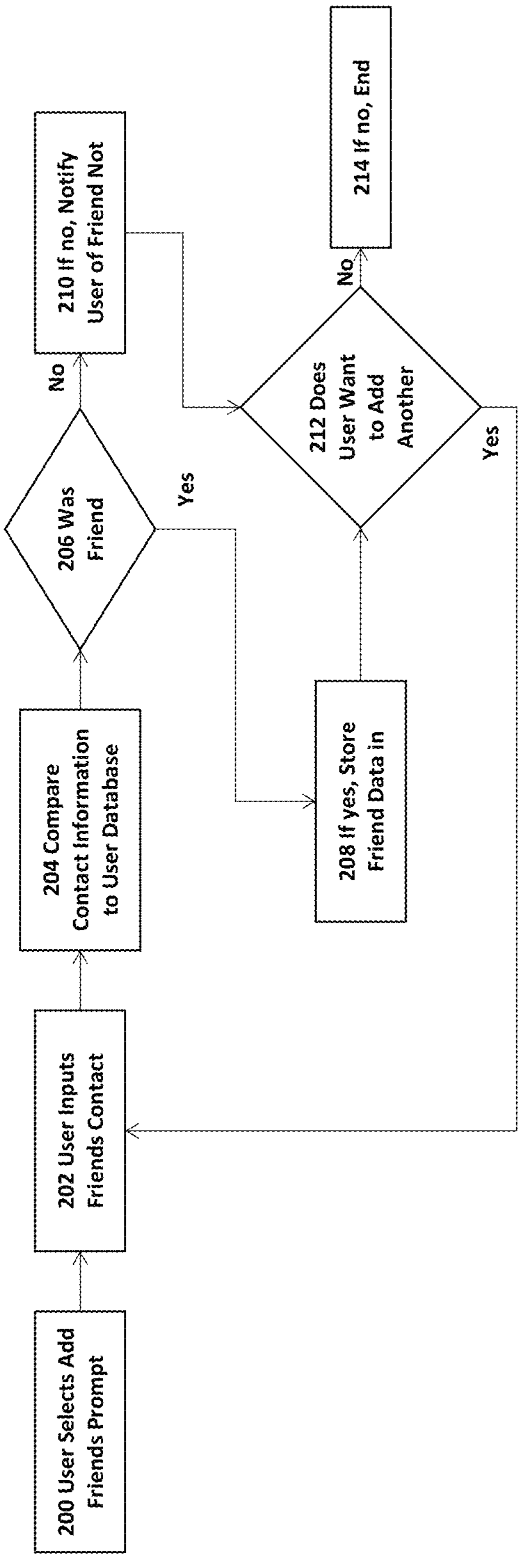

FIG. 2: illustrates an add friends module, according to an embodiment.

FIG. 3: illustrates a contact database, according to an embodiment.

Figure 4:
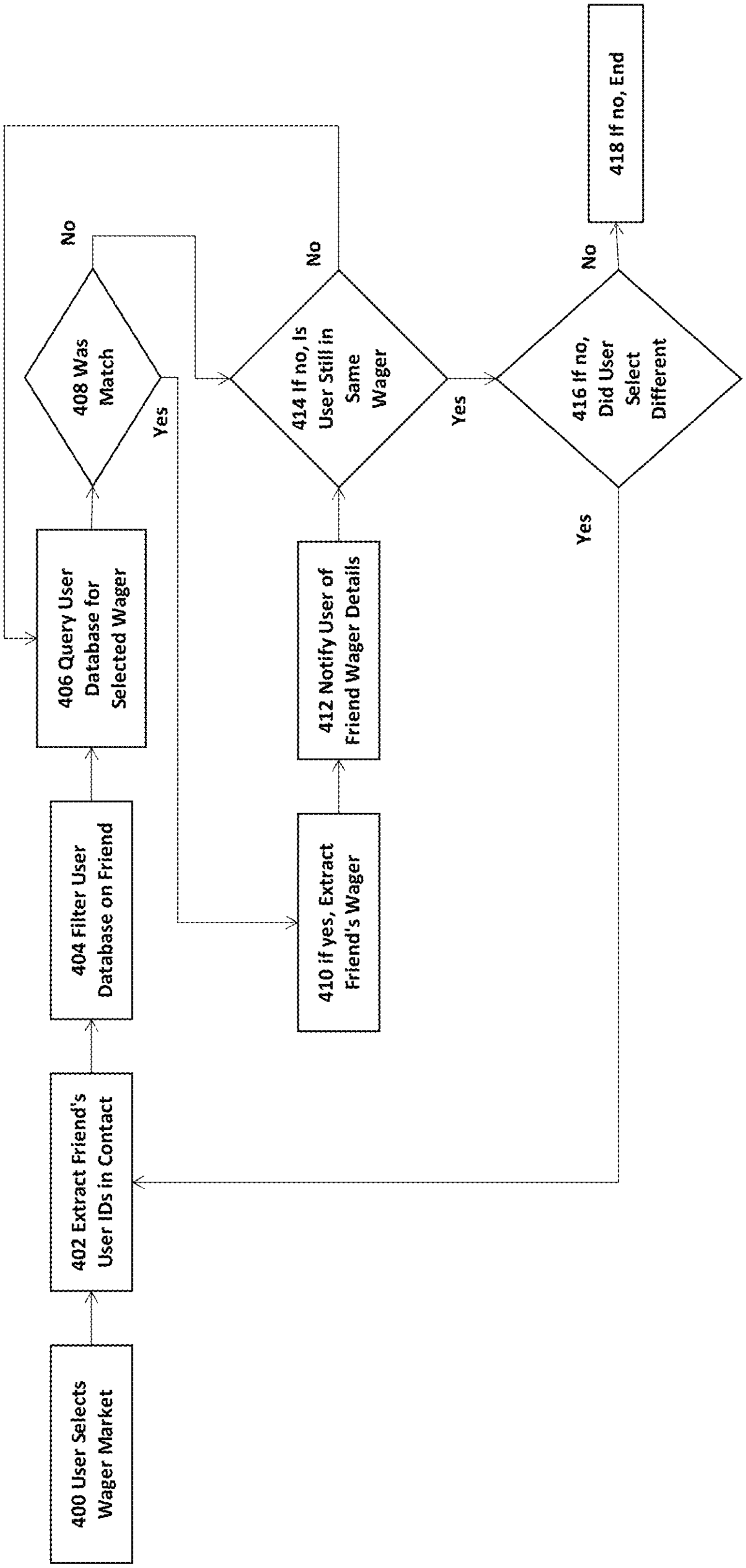

FIG. 4: illustrates a wager indicator module, according to an embodiment.

DETAILED DESCRIPTION

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word exemplary means serving as an example, instance or illustration. The embodiments described herein are not limiting, but rather are exemplary only. The described embodiments are not necessarily to be construed as preferred or advantageous over other embodiments. Moreover, the terms embodiments of the invention, embodiments, or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that specific circuits can perform the various sequence of actions described herein (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in several different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of terminology used herein is provided.

An action refers to a specific play or specific movement in a sporting event. For example, an action may determine which players were involved during a sporting event. In some embodiments, an action may be a throw, shot, pass, swing, kick, and/or hit performed by a participant in a sporting event. In some embodiments, an action may be a strategic decision made by a participant in the sporting event, such as a player, coach, management, etc. In some embodiments, an action may be a penalty, foul, or other type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity based on the outcome of a future event, such as the results of a game or event. It may be understood that non-monetary items may be the subject of a "bet" or "wager" as well, such as points or anything else that can be quantified for a "bet" or "wager." A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be made for certain amount or for a future time. A "bet" or "wager" can be made for being able to answer a question correctly. A "bet" or "wager" can be made within a certain period. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to set of both implicit and explicit rules, in an electronically powered domain to place bets on the outcome of sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example, up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to "chalk eaters" (often a derogatory term). An event or game in which the sportsbook has reduced its betting limits, usually because of weather or the uncertain status of injured players, is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides," "favorite," "chalk," "circled game," "laying the points price," "dog," and "underdog" can be integrated into the embodiments in a variety of manners.

The "money line" refers to the odds expressed in terms of money. With money odds, whenever there is a minus (−), the player "lays" or is "laying" that amount to win (for example, $100); where there is a plus (+), the player wins that amount for every $100 wagered. A "straight bet" refers to an individual wager on a game or event that will be determined by a point spread or money line. The term "straight-up" means winning the game without any regard to the "point spread," a "money-line" bet. "Money line," "straight bet," and "straight-up" can be integrated into the embodiments in a variety of manners.

The "line" refers to the current odds or point spread on a particular event or game. The "point spread" refers to the margin of points in which the favored team must win an event by to "cover the spread." To "cover" means winning by more than the "point spread." A handicap of the "point spread" value is given to the favorite team so bettors can choose sides at equal odds. "Cover the spread" means that a favorite wins an event with the handicap considered or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread." The "opening line" means the earliest line posted for a particular sporting event or game. The term "pick" or "pick 'em" refers to a game when neither team is favored in an event or game. "Line," "cover the spread," "cover," "tie," "pick," and "pick-em" can be integrated into the embodiments in a variety of manners.

To "middle" means to win both sides of a game; wagering on the "underdog" at one point spread and the favorite at a different point spread and winning both sides. For example, if the player bets the underdog+4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to set of both implicit and explicit rules in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. The event can be integrated into the embodiments in a variety of manners.

The "total" is the combined number of runs, points or goals scored by both teams during the game, including overtime. The "over" refers to a sports bet in which the player wagers that the combined point total of two teams will be more than a specified total. The "under" refers to bets that the total points scored by two teams will be less than a certain figure. "Total," "over," and "under" can be integrated into the embodiments in a variety of manners.

A "parlay" is a single bet that links together two or more wagers; to win the bet, the player must win all the wagers in the "parlay." If the player loses one wager, the player loses the entire bet. However, if they win all the wagers in the "parlay," the player receives a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay," "round robin," "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games, and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events. Typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both pitchers scheduled to start a game start. If they do not, the bet is deemed "no action" and refunded. The "run line" in baseball refers to a spread used instead of the money line. "Listed pitchers," "no action," and "run line" can be integrated into the embodiments in a variety of manners.

The term "handle" refers to the total amount of bets taken. The term "hold" refers to the percentage the house wins. The term "juice" refers to the bookmaker's commission, most commonly the 11 to 10 bettors lay on straight point spread wagers: also known as "vigorish" or "vig". The "limit" refers to the maximum amount accepted by the house before the odds and/or point spread are changed. "Off the board" refers to a game in which no bets are being accepted. "Handle," "juice," vigorish," "vig," and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations or individuals that would deploy, for fees, and may be part of, or perform, various system elements or method steps in the embodiments.

Managed service user interface service is a service that can help customers (1) manage third parties, (2) develop the web, (3) perform data analytics, (4) connect thru application program interfaces and (4) track and report on player behaviors. A managed service user interface can be integrated into the embodiments in a variety of manners.

Managed service risk management service are services that assist customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling, and (4) customer service assistance. These managed service compliance services can be integrated into the embodiments in a variety of manners.

Managed service pricing and trading service is a service that helps customers with (1) official data feeds, (2) data visualization, and (3) land based on property digital signage. These managed service pricing and trading services can be integrated into the embodiments in a variety of manners.

Managed service and technology platforms are services that help customers with (1) web hosting, (2) IT support, and (3) player account platform support. These managed service and technology platform services can be integrated into the embodiments in a variety of manners.

Managed service and marketing support services are services that help customers (1) acquire and retain clients and users, (2) provide for bonusing options, and (3) develop press release content generation. These managed service and marketing support services can be integrated into the embodiments in a variety of manners.

Payment processing services are services that help customers with (1) account auditing and (2) withdrawal processing to meet standards for speed and accuracy. Further, these services can provide for integration of global and local payment methods. These payment processing services can be integrated into the embodiments in a variety of manners.

Engaging promotions allow customers to treat players to free bets, odds boosts, enhanced access, and flexible cashback to boost lifetime value. Engaging promotions can be integrated into the embodiments in a variety of manners.

"Cash out" or "pay out" or "payout" allow customers to make available, on singles bets or accumulated bets with a partial cash out where each operator can control payouts by always managing commission and availability. The "cash out" or "pay out" or "payout" can be integrated into the embodiments in a variety of manners, including both monetary and non-monetary payouts, such as points, prizes, promotional or discount codes, and the like.

"Customized betting" allows customers to have tailored personalized betting experiences with sophisticated tracking and analysis of players' behavior. "Customized betting" can be integrated into the embodiments in a variety of manners.

Kiosks are devices that offer interactions with customers, clients, and users with a wide range of modular solutions for both retail and online sports gaming. Kiosks can be integrated into the embodiments in a variety of manners.

Business Applications are an integrated suite of tools for customers to manage the everyday activities that drive sales, profit, and growth by creating and delivering actionable insights on performance to help customers to manage the sports gaming. Business Applications can be integrated into the embodiments in a variety of manners.

State-based integration allows for a given sports gambling game to be modified by states in the United States or other countries, based upon the state the player is in, mobile phone, or other geolocation identification means. State-based integration can be integrated into the embodiments in a variety of manners.

Game Configurator allows for configuration of customer operators to have the opportunity to apply various chosen or newly created business rules on the game as well as to parametrize risk management. The Game Configurator can be integrated into the embodiments in a variety of manners.

"Fantasy sports connectors" are software connectors between method steps or system elements in the embodiments that can integrate fantasy sports. Fantasy sports allow a competition in which participants select imaginary teams from among the players in a league and score points according to the actual performance of their players. For example, if a player in fantasy sports is playing at a given real-time sport, odds could be changed in the real-time sports for that player.

Software as a service (or SaaS) is a software delivery and licensing method in which software is accessed online via a subscription rather than bought and installed on individual computers. Software as a service can be integrated into the embodiments in a variety of manners.

Synchronization of screens means synchronizing bets and results between devices, such as TV and mobile, PC, and wearables. Synchronization of screens can be integrated into the embodiments in a variety of manners.

Automatic content recognition (ACR) is an identification technology that recognizes content played on a media device or present in a media file. Devices containing ACR support enable users to quickly obtain additional information about the content they see without any user-based input or search efforts. A short media clip (audio, video, or both) is selected to start the recognition. This clip could be selected from within a media file or recorded by a device. Through algorithms such as fingerprinting, information from the actual perceptual content is taken and compared to a database of reference fingerprints, wherein each reference fingerprint corresponds with a known recorded work. A database may contain metadata about the work and associated information, including complementary media. If the media clip's fingerprint is matched, the identification software returns the corresponding metadata to the client application. For example, during an in-play sports game, a "fumble" could be recognized and at the time stamp of the event, metadata such as "fumble" could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real time view of the game can be seen and a "bet"—which is a computer-generated data point—is placed above the player that is bet on. Augmented reality can be integrated into the embodiments in a variety of manners.

Some embodiments of this disclosure, illustrating all its features, will now be discussed in detail. It can be understood that the embodiments are intended to be open-ended in that an item or items used in the embodiments is not meant to be an exhaustive listing of such item or items or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

FIG. 1 is a system for notifications for known contact(s) or friend(s) wagers. This system may include a live event 102, for example, a sporting event such as a football, basketball, baseball, or hockey game, tennis match, golf tournament, eSports, or digital game, etc. The live event 102 may include some number of actions or plays, upon which a user, bettor, or customer can place a bet or wager, typically through an entity called a sportsbook. There are numerous types of wagers the bettor can make, including, but not limited to, a straight bet, a money line bet, or a bet with a point spread or line that the bettor's team would need to cover if the result of the game with the same as the point spread the user would not cover the spread, but instead the tie is called a push. If the user bets on the favorite, points are given to the opposing side, which is the underdog or longshot. Betting on all favorites is referred to as chalk and is typically applied to round-robin or other tournaments' styles. There are other types of wagers, including, but not limited to, parlays, teasers, and prop bets, which are added games that often allow the user to customize their betting by changing the odds and payouts received on a wager. Certain sportsbooks will allow the bettor to buy points which moves the point spread off the opening line. This increases the price of the bet, sometimes by increasing the juice, vig, or hold that the sportsbook takes. Another type of wager the bettor can make is an over/under, in which the user bets over or under a total for the live event 102, such as the score of an American football game or the run line in a baseball game, or a series of actions in the live event 102. Sportsbooks have several bets they can handle, limiting the number of wagers they can take on either side of a bet before they will move the line or odds off the opening line. Additionally, there are circumstances, such as an injury to an important player like a listed pitcher, in which a sportsbook, casino, or racino may take an available wager off the board. As the line moves, an opportunity may arise for a bettor to bet on both sides at different point spreads to middle, and win, both bets. Sportsbooks will often offer bets on portions of games, such as first-half bets and half-time bets. Additionally, the sportsbook can offer futures bets on live events in the future. Sportsbooks need to offer payment processing services to cash out customers which can be done at kiosks at the live event 102 or at another location.

Further, embodiments may include a plurality of sensors 104 that may be used such as motion, temperature, or humidity sensors, optical sensors, and cameras such as an RGB-D camera which is a digital camera capable of capturing color (RGB) and depth information for every pixel in an image, microphones, radiofrequency receivers, thermal imagers, radar devices, lidar devices, ultrasound devices, speakers, wearable devices, etc. Also, the plurality of sensors 104 may include but are not limited to, tracking devices, such as RFID tags, GPS chips, or other such devices embedded on uniforms, in equipment, in the field of play and boundaries of the field of play, or on other markers in the field of play. Imaging devices may also be used as tracking devices, such as player tracking, which provide statistical information through real-time X, Y positioning of players and X, Y, Z positioning of the ball.

Further, embodiments may include a cloud 106 or a communication network that may be a wired and/or wireless network. The communication network, if wireless, may be implemented using communication techniques such as visible light communication (VLC), worldwide interoperability for microwave access (WiMAX), long term evolution (LTE), wireless local area network (WLAN), infrared (IR) communication, public switched telephone network (PSTN), radio waves, or other communication techniques that are known in the art. The communication network may allow ubiquitous access to shared pools of configurable system resources and higher-level services that can be rapidly provisioned with minimal management effort, often over the internet, and relies on sharing resources to achieve coherence and economies of scale, like a public utility. In contrast, third-party clouds allow organizations to focus on their core businesses instead of expending resources on computer infrastructure and maintenance. The cloud 106 may be communicatively coupled to a peer-to-peer wagering network 114, which may perform real-time analysis on the type of play and the result of the play. The cloud 106 may also be synchronized with game situational data such as the time of the game, the score, location on the field, weather conditions, and the like, which may affect the choice of play utilized. For example, in an exemplary embodiment, the cloud 106 may not receive data gathered from the sensors 104 and may, instead, receive data from an alternative data feed, such as Sports Radar®. This data may be compiled substantially immediately following the completion of any play and may be compared with a variety of team data and league data based on a variety of elements, including the current down, possession, score, time, team, and so forth, as described in various exemplary embodiments herein.

Further, embodiments may include a mobile device 108 such as a computing device, laptop, smartphone, tablet, computer, smart speaker, or I/O devices. I/O devices may be present in the computing device. Input devices may include but are not limited to, keyboards, mice, trackpads, trackballs, touchpads, touch mice, multi-touch touchpads and touch mice, microphones, multi-array microphones, drawing tablets, cameras, single-lens reflex cameras (SLRs), digital SLRs (DSLRs), complementary metal-oxide semiconductor (CMOS) sensors, accelerometers, IR optical sensors, pressure sensors, magnetometer sensors, angular rate sensors, depth sensors, proximity sensors, ambient light sensors, gyroscopic sensors, or other sensors. Output devices may include but are not limited to, video displays, graphical displays, speakers, headphones, inkjet printers, laser printers, or 3D printers. Devices may include, but are not limited to, a combination of multiple input or output devices such as, Microsoft KINECT, Nintendo Wii remote, Nintendo WII U GAMEPAD, or Apple iPhone. Some devices allow gesture recognition inputs by combining input and output devices. Other devices allow for facial recognition, which may be utilized as an input for different purposes such as authentication or other commands. Some devices provide for voice recognition and inputs including, but not limited to, Microsoft KINECT, SIRI for iPhone by Apple, Google Now, or Google Voice Search. Additional user devices have both input and output capabilities including but not limited to, haptic feedback devices, touchscreen displays, or multi-touch displays. Touchscreen, multi-touch displays, touchpads, touch mice, or other touch sensing devices may use different technologies to sense touch, including but not limited to, capacitive, surface capacitive, projected capacitive touch (PCT), in-cell capacitive, resistive, IR, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, but not limited to, pinch, spread, rotate, scroll, or other gestures. Some touchscreen devices, including but not limited to, Microsoft PIXELSENSE or Multi-Touch Collaboration Wall, may have larger surfaces, such as on a table-top or on a wall, and may also interact with other electronic devices. Some I/O devices, display devices, or groups of devices may be augmented reality devices. An I/O controller may control one or more I/O devices, such as a keyboard and a pointing device, or a mouse or optical pen. Furthermore, an I/O device may also contain storage and/or an installation medium for the computing device. In some embodiments, the computing device may include USB connections (not shown) to receive handheld USB storage devices. In further embodiments, an I/O device may be a bridge between the system bus and an external communication bus, e.g., USB, SCSI, FireWire, Ethernet, Gigabit Ethernet, Fiber Channel, or Thunderbolt buses. In some embodiments, the mobile device 108 could be an optional component and may be utilized in a situation where a paired wearable device employs the mobile device 108 for additional memory or computing power or connection to the internet.

Further, embodiments may include a wagering software application or a wagering app 110, which is a program that enables the user to place bets on individual plays in the live event 102, streams audio and video from the live event 102, and features the available wagers from the live event 102 on the mobile device 108. The wagering app 110 allows the user to interact with the wagering network 114 to place bets and provide payment/receive funds based on wager outcomes.

Further, embodiments may include a mobile device database 112 that may store some or all the user's data, the live event 102, or the user's interaction with the wagering network 114.

Further, embodiments may include the wagering network 114, which may perform real-time analysis on the type of play and the result of a play or action. The wagering network 114 (or the cloud 106) may also be synchronized with game situational data, such as the time of the game, the score, location on the field, weather conditions, and the like, which may affect the choice of play utilized. For example, in an exemplary embodiment, the wagering network 114 may not receive data gathered from the sensors 104 and may, instead, receive data from an alternative data feed, such as SportsRadar®. This data may be provided substantially immediately following the completion of any play and may be compared with a variety of team data and league data based on a variety of elements, including the current down, possession, score, time, team, and so forth, as described in various exemplary embodiments herein. The wagering network 114 can offer several SaaS managed services such as user interface service, risk management service, compliance, pricing and trading service, IT support of the technology platform, business applications, game configuration, state-based integration, fantasy sports connection, integration to allow the joining of social media, or marketing support services that can deliver engaging promotions to the user.

Further, embodiments may include a user database 116, which may contain data relevant to all users of the wagering network 114 and may include, but is not limited to, a user ID, a device identifier, a paired device identifier, wagering history, or wallet information for the user. The user database 116 may also contain a list of user account records associated with respective user IDs. For example, a user account record may include, but is not limited to, information such as user interests, user personal details such as age, mobile number, etc., previously played sporting events, highest wager, favorite sporting event, or current user balance and standings. In addition, the user database 116 may contain betting lines and search queries. The user database 116 may be searched based on a search criterion received from the user. Each betting line may include but is not limited to, a plurality of betting attributes such as at least one of the following: the live event 102, a team, a player, an amount of wager, etc. The user database 116 may include, but is not limited to, information related to all the users involved in the live event 102. In one exemplary embodiment, the user database 116 may include information for generating a user authenticity report and a wagering verification report. Further, the user database 116 may be used to store user statistics like, but not limited to, the retention period for a particular user, frequency of wagers placed by a particular user, the average amount of wager placed by each user, etc.

Further, embodiments may include a historical plays database 118 that may contain play data for the type of sport being played in the live event 102. For example, in American Football, for optimal odds calculation, the historical play data may include metadata about the historical plays, such as time, location, weather, previous plays, opponent, physiological data, etc.

Further, embodiments may utilize an odds database 120—that may contain the odds calculated by an odds calculation module 122—to display the odds on the user's mobile device 108 and take bets from the user through the mobile device wagering app 110.

Further, embodiments may include the odds calculation module 122, which may utilize historical play data to calculate odds for in-play wagers.

Further, embodiments may include an add friends module 124 (which may also be known as an add contacts module), which may begin with the user selecting an add friends (or add contacts) prompt on the wagering app 110 user interface. For example, the wagering app 110 may have a prompt, button, or icon to add friends through the app. Then the user may input the friend's contact information. For example, the user may input the friends' e-mail addresses, phone numbers, user ID, etc. The add friends module 124 may compare the inputted contact information to the user database 116. For example, the e-mail address, phone number, user ID, etc., may be compared to all the e-mail addresses, phone numbers, user IDs, etc., stored in the user database 116 to see if there are matching entries. Then the add friends module 124 may determine if there was a match between the inputted contact information and the user database 116. For example, if there is a match between the e-mail address, phone number, user ID, etc., the user inputted and the e-mail addresses, phone numbers, user IDs, etc., stored in the user database 116. If there is a match and the friend was found, then the add friends module 124 may store the friend's data in the contact database 126. For example, the data stored may be information such as user interests, user personal details such as age, mobile number, e-mail address, user ID, etc., previously played sporting events, sporting events the user is currently playing, highest wager, favorite sporting event, or current user balance and standings. If there is no match and the friend was not found, the add friends module 124 may notify the user that the friend was not found. Then the add friends module may determine if the user wants to add another friend. If the user wants to add another friend, then the process may return to the user inputting the contact information. If the user does not want to add another friend, then the process may end.

Further, embodiments may include a contact database 126, which may contain the user IDs, e-mail addresses, and phone numbers for the friends or contacts that the user has added through the process described in the add friends module 124. The contact database 126 may also contain a device identifier, a paired device identifier, wagering history, or wallet information for the user. The contact database 126 may also contain a list of user account records associated with respective user IDs. For example, a user account record may include, but is not limited to, information such as user interests, user personal details such as age, mobile number, etc., previously played sporting events, currently playing sporting events or wager markets, highest wager, favorite sporting event, or current user balance and standings.

Further, embodiments may include a wager indicator module 128, which may begin with the user selecting a wagering market. For example, the user selects the Boston Red Sox vs. New York Yankees wager market on a play-by-play wagering network. Then the wager indicator module 128 may extract the friend's user IDs stored in the contact database 126. For example, the data stored in the contact database 126, such as the user IDs, the e-mail addresses, the phone numbers, etc., are extracted. The wager indicator module 128 may filter the user database 116 on the extracted user IDs from the contact database 126. For example, the user database 116 may be filtered to only include the users in the contact database 126. The user database 116 may contain a user ID, a device identifier, a paired device identifier, wagering history, or wallet information for the user. The user database 116 may also contain a list of user account records associated with respective user IDs. For example, a user account record may include, but is not limited to, information such as user interests, user personal details such as age, mobile number, etc., previously played sporting events, highest wager, favorite sporting event, or current user balance and standings. Then the wager indicator module 128 may query the user database 116 for the selected wager market. For example, the wager indicator module 128 may query the user database 116 for the wagering market of Boston Red Sox vs. New York Yankees, which may be stored in the wagering history section of the user database 116. The wager indicator module 128 may determine if there was a match found between the selected wager market by the user and the wager markets stored in the user database 116. For example, if the user selected the wagering market of Boston Red Sox vs. New York Yankees and in the filtered user database 116 in the wagering history, there is an entry for one or more of the user's friends placed a wager on the wagering market. If there was a match, then the wager indicator module 128 may extract the friend's wager details. For example, the wager indicator module 128 may extract the friend's user ID, name, and the wager placed, such as the 1st pitch of the Boston Red Sox vs. New York Yankees will be a strike. Then the wager indicator module 128 may notify the user of the friend's wager details. For example, the wager indicator module 128 may send a notification with the information, such as the friend's user ID, name, and the wager placed, such as the 1st pitch of the Boston Red Sox vs. New York Yankees will be a strike. In some embodiments, the notification may be presented on the wagering app 110 as a banner notification, text message, message in a chat, a pop-up icon on the user interface, etc. The wager indicator module 128 may determine if the user is still in the same wager market. If the user is still in the same wager market, the process may return to query the user database 116 for the selected market with the user database 116 filtered on the extracted friend user IDs from the contact database 126. For example, if the user is still in the wagering market of Boston Red Sox vs. New York Yankees, then the process may return to querying the user database 116 to see if there are additional wagers placed by the user's friends on the same wager market using the wagering history that is stored in the user database 116. If the user is no longer in the same wager market, then the wager indicator module 128 may determine if the user selected a different wager market. If the user selected another wager market, then the process may return to extracting the friend's user IDs in the contact database 126. For example, the user may select a different wager market, such as the Toronto Blue Jays vs. Tampa Rays, and the process may return to extract the data stored in the contact database 126. If the user did not select another wager market or a different wager market, then the process may end. For example, if the user leaves the wagering market and does not open or select a new wager market, the process may end.

FIG. 2 illustrates the add friends module 124 (also known as a contacts module). The process may begin with the user selecting, at step 200, an add friends (or add contacts) prompt on the wagering app 110 user interface. For example, the wagering app 110 may have a prompt, button, or icon to add friends through the app. Then the user may input, at step 202, the friend's contact information. For example, the user may input the friend's e-mail address, phone number, user ID, etc. It may be appreciated that once a friend or contact is added, then that person or entity may be considered as a known contact. The add friends module 124 may compare, at step 204, the inputted contact information to the user database 116. For example, the e-mail address, phone number, user ID, etc., may be compared to all the e-mail addresses, phone numbers, user IDs, etc., stored in the user database 116 to see if there are matching entries. Then the add friends module 124 may determine, at step 206, if there was a match between the inputted contact information and the user database 116. For example, if there is a match between the e-mail address, phone number, user ID, etc., the user inputted and the e-mail addresses, phone numbers, user IDs, etc., stored in the user database 116. If there is a match and the friend was found, then the add friends module 124 may store, at step 208, the friend's data in the contact database 126 to make that friend or contact a known contact. For example, the data stored may be information such as user interests, user personal details such as age, mobile number, e-mail address, user ID, etc., previously played sporting events, sporting events the user is currently playing, highest wager, favorite sporting event, or current user balance and standings. If there is no match and the friend was not found, the add friends module 124 may notify, at step 210, the user that the friend was not found. Then the add friends module may determine, at step 212, if the user wants to add another friend. If the user wants to add another friend, then the process may return to step 202, where the user may input the contact information. If the user does not want to add another friend, then the process may end at step 214.

FIG. 3 illustrates the contact database 126. The contact database 126 may contain the user IDs, e-mail addresses, and phone numbers for the friends or contacts that the user has added through the process described in the add friends module 124. The contact database 124 may also contain a device identifier, a paired device identifier, wagering history, or wallet information for the user. The contact database 126 may also contain a list of user account records associated with respective user IDs. For example, a user account record may include, but is not limited to, information such as user interests, user personal details such as age, mobile number, etc., previously played sporting events, currently playing sporting events or wager markets, highest wager, favorite sporting event, or current user balance and standings.

FIG. 4 illustrates the wager indicator module 128. The process may begin with the user selecting, at step 400, a wagering market. For example, the user selects the Boston Red Sox vs. New York Yankees wager market on a play-by-play wagering network. Then the wager indicator module 128 may extract, at step 402, the friend's user IDs stored in the contact database 126. For example, the data stored in the contact database 126, such as the user IDs, the e-mail addresses, the phone numbers, etc., may be extracted. The wager indicator module 128 may filter, at step 404, the user database 116 on the extracted user IDs from the contact database 126. For example, the user database 116 is filtered to only include the users in the contact database 126. The user database 116 may contain a user ID, a device identifier, a paired device identifier, wagering history, or wallet information for the user. The user database 116 may also contain a list of user account records associated with respective user IDs. For example, a user account record may include, but is not limited to, information such as user interests, user personal details such as age, mobile number, etc., previously played sporting events, highest wager, favorite sporting event, or current user balance and standings. Then the wager indicator module 128 may query, at step 406, the user database 116 for the selected wager market. For example, the wager indicator module 128 may query the user database 116 for the wagering market of Boston Red Sox vs. New York Yankees, which may be stored in the wagering history section of the user database 116. The wager indicator module 128 may determine, at step 408, if there was a match found between the selected wager market by the user and the wager markets stored in the user database 116. For example, if the user selected the wagering market of Boston Red Sox vs. New York Yankees and in the filtered user database 116 in the wagering history, there is an entry for one or more of the user's friends placed a wager on the wagering market. If no match was found, the wager indicator module 128 may skip to step 414. If there was a match found, then the wager indicator module 128 may extract, at step 410, the friends wager details. For example, the wager indicator module 128 may extract the friend's user ID, name, and the wager placed, such as the 1st pitch of the Boston Red Sox vs. New York Yankees will be a strike. Then the wager indicator module 128 may notify, at step 412, the user of the friend's wager details. For example, the wager indicator module 128 may send a notification with the information, such as the friend's user ID, name, and the wager placed, such as the 1st pitch of the Boston Red Sox vs. New York Yankees will be a strike. In some embodiments, the notification may be presented on the wagering app 110 as a banner notification, text message, message in a chat, a pop-up icon on the user interface, etc. The wager indicator module 128 may determine, at step 414, if the user is still in the same wager market. If the user is still in the same wager market, the process may return to query the user database 116 for the selected market with the user database 116 filtered on the extracted friend user IDs from the contact database 126. For example, if the user is still in the wagering market of Boston Red Sox vs. New York Yankees, then the process may return to querying the user database 116 to see if there are additional wagers placed by the user's friends on the same wager market using the wagering history that is stored in the user database 116. If the user is no longer in the same wager market, then the wager indicator module 128 may determine, at step 416, if the user selected a different wager market. If the user selected another wager market, then the process may return to extracting the friend's user IDs in the contact database 126. For example, the user may select a different wager market, such as the Toronto Blue Jays vs. Tampa Rays, and the process may return to extract the data stored in the contact database 126. If the user did not select another wager market or a different wager market, then the process may end at step 418. For example, if the user leaves the wagering market and does not open or select a new wager market, the process may end.

The invention claimed is:

1. A method for informing a user of wagers of a known contact on a wagering network, comprising:
- receiving a first set of known contact data from the user;
- comparing the first set of known contact data to at least an additional set of contact data stored in a user database for a match;
- storing the match within a contact database;
- extracting a set of user wager market data from a user wager market database;
- querying the user database for at least an additional set of user wager market data for a match;
- informing the user of the match or an absence of a match;
- displaying a match on a device of the user; and
- determining if the user is still in the same wager market.

2. The method for informing a user of wagers of a known contact on a wagering network of claim 1, further comprising utilizing at least a notification, a message, a banner, a text, or a pop-up icon on a device to inform the user.

3. The method for informing a user of wagers of a known contact on a wagering network of claim 2, wherein the notification further comprises a user ID, a name, and a type of wager placed.

4. The method for informing a user of wagers of a known contact on a wagering network of claim 1, further comprising determining if the user is still in the same wager market before a next action in the live sporting event by analyzing if the user has selected a separate wager market via the mobile device.

5. The method for informing a user of wagers of a known contact on a wagering network of claim 1, further comprising displaying the wager information of the match of the device of the user.

6. A system for informing a user of wagers of a known contact on a wagering network, comprising:
- a contact database;
- a user wager market database;
- a user database, wherein the user wager market database and the user database are configured to house at least a user ID, an email address, a mobile number, a wager amount of the user, and current user balance and standings;
- a wager indicator module configured to
  - extract user data from the user wager market database,
  - compare the extracted user data with the user database for a match,
  - extract the match, and
  - notify the user of the match; and
- an adds friends module, wherein the adds friend module is configured to
  - receive input data from the user,
  - compare the input data with the user database for the match,
  - store the match in the contact database, and
  - when the user is still in the same wager market, query the user database for additional wagers placed by contacts of the user in the same wager market.

7. The system for informing a user of wagers of a known contact on a wagering network of claim 6, wherein the same wager market involves wagers placed on a matching pair of teams.

8. The system for informing a user of wagers of a known contact on a wagering network of claim 6, wherein the same wager market involves wagers placed on the same league.

9. A method for informing a user of wagers of a known contact on a wagering network, comprising:
- receiving a first set of known contact data from the user;
- comparing the first set of known contact data to at least an additional set of contact data stored in a user database for a match;
- storing the match within a contact database;
- extracting a set of user wager market data from a user wager market database;
- informing the user of the match or an absence of the match; and,
- when the user is still in the same wager market, querying the user database for additional wagers placed by contacts of the user in the same wager market.

10. The method for informing a user of wagers of a known contact on a wagering network of claim 1, wherein the same wager market involves wagers placed on a matching pair of teams.

11. The method for informing a user of wagers of a known contact on a wagering network of claim 1, wherein the same wager market involves wagers placed on the same league.

* * * * *